United States Patent
Aharoni et al.

(10) Patent No.: US 11,856,083 B2
(45) Date of Patent: Dec. 26, 2023

(54) ANALYSIS AND DEBUGGING OF FULLY-HOMOMORPHIC ENCRYPTION

(71) Applicant: International Business Machines Corporation, Armonk, NY (US)

(72) Inventors: Ehud Aharoni, Kfar Saba (IL); Omri Soceanu, Haifa (IL); Allon Adir, Kiryat Tivon (IL); Gilad Ezov, Nesher (IL); Hayim Shaul, Kfar Saba (IL)

(73) Assignee: International Business Machines Corporation, Armonk, NY (US)

(*) Notice: Subject to any disclaimer, the term of this patent is extended or adjusted under 35 U.S.C. 154(b) by 107 days.

(21) Appl. No.: 17/569,672

(22) Filed: Jan. 6, 2022

(65) Prior Publication Data

US 2023/0216657 A1    Jul. 6, 2023

(51) Int. Cl.
*H04L 9/00* (2022.01)
*G06F 9/38* (2018.01)

(52) U.S. Cl.
CPC ............ *H04L 9/008* (2013.01); *G06F 9/3887* (2013.01)

(58) Field of Classification Search
CPC ............................... H04L 9/008; G06F 9/3887
See application file for complete search history.

(56) References Cited

U.S. PATENT DOCUMENTS

| | | | | |
|---|---|---|---|---|
| 2013/0170640 A1* | 7/2013 | Gentry | ................... | H04L 9/008 380/30 |
| 2013/0216044 A1* | 8/2013 | Gentry | ................... | H04L 9/008 380/277 |
| 2015/0358153 A1 | 12/2015 | Gentry | | |
| 2018/0359079 A1 | 12/2018 | Hu | | |
| 2021/0056448 A1* | 2/2021 | Stepanova | ............. | G06N 5/025 |
| 2022/0121552 A1* | 4/2022 | Blatt | ..................... | G06F 11/362 |
| 2023/0132500 A1* | 5/2023 | Sinha Roy | .............. | H04L 9/008 380/28 |

FOREIGN PATENT DOCUMENTS

CN      108809619 A    11/2018

OTHER PUBLICATIONS

Homomorphic Encryption for Secure Computation on Big Data, by Hallman et al., published 2018. (Year: 2018).*

(Continued)

*Primary Examiner* — Vu V Tran
(74) *Attorney, Agent, or Firm* — Dvir Gassner (57) ABSTRACT

In response to identifying that a Single Instruction, Multiple Data (SIMD) operation has been instructed to be performed or has been performed by a Fully-Homomorphic Encryption (FHE) software on one or more original ciphertexts, performing the following steps: Performing the same operation on one or more original plaintexts, respectively, that are each a decrypted version of one of the one or more original ciphertexts. Decrypting a ciphertext resulting from the operation performed on the one or more original ciphertexts. Comparing the decrypted ciphertext with a plaintext resulting from the same operation performed on the one or more original plaintexts. Based on said comparison, performing at least one of: (a) determining an amount of noise caused by the operation, (b) determining whether unencrypted data underlying the one or more original ciphertexts has become corrupt by the operation, and (c) determining correctness of an algorithm which includes the operation.

16 Claims, 6 Drawing Sheets

(56) References Cited

OTHER PUBLICATIONS

SoK: Fully Homomorphic Encryption Compilers, by Viand, published 2021 (Year: 2021).*
A JAVA Implementation of Paillier Homomorphic Encryption Scheme by Yau et al., published 2017, (Year: 2017).*
Ilaria Chillotti et al, "CONCRETE: Concrete Operates oN Ciphertexts Rapidly by Extending TfhE"; Online at: https://homomorphicencryption.org/wp-content/uploads/2020/12/wahc20_demo_damien.pdf. Dec. 2020.
Liu Wenchao et al, "Debugging and analysis of GPU-based fully homomorphic encryption software library"; Information Network Security,2019(6):76-83. Online at: http://netinfo-security.org/article/2019/1671-1122/1671-1122-19-6-76.shtml., 2019.

* cited by examiner

ANALYSIS AND DEBUGGING OF FULLY-HOMOMORPHIC ENCRYPTION

BACKGROUND

The invention relates to the field of homomorphic encryption, particularly fully-homomorphic encryption.

Fully-homomorphic encryption (FHE) is a type of encryption that allows computations to be made on encrypted data ("ciphertext") without first decrypting it. These computations will yield the same results, when decrypted, as if they were performed on the same data in its unencrypted form ("plaintext").

In FHE, the encryption scheme includes an encryption operation that encrypts a vector of some fixed size, creating a ciphertext, and the computations include operations known as SIMD (Single Instruction, Multiple Data) operations. A decryption operation then retrieves the data from the resulting ciphertext. The encryption scheme generally ensures that any computations performed on the encrypted data will yield the same results as applying the same computations to the underlying unencrypted data.

This unique characteristic of FHE makes it particularly useful when computation of personal or sensitive data has to be outsourced to an entity or location where their secrecy cannot be guaranteed. Such personal or sensitive data can be first encrypted using homomorphic encryption, and then transmitted (for example, to commercial cloud environment) for processing, all while encrypted. The results of the computations, still in an encrypted form, are then provided back to the original sender, who can decrypt them in a safe environment and observe the results. This procedure diminishes privacy and other secrecy concerns, as the unencrypted data is never made available to the entity performing the computations, and naturally also not to any malicious third party which manages to compromise that entity's computer storage.

FHE, however, is not without limitations. In some encryption schemes, such as the well-known Cheon-Kim-Kim-Song (CKKS) scheme, computations often introduce certain noise to the data, which compounds as the number of sequential operations increases. This causes a certain deviation of the post-computation encrypted data from results that would have been produced had the computations been performed on the original, unencrypted data. When a large enough number of sequential operations is performed, the noise may be so significant that the results can completely lose their reliability.

Another limitation that sometimes arises is data corruption. Some FHE schemes are known to be somewhat limited with respect to the range of values of unencrypted data they can successfully handle. For some computations the results may exceed ("overflow") this range, or some intermediate values within the computation may exceed this range. In both cases the results will be corrupted, that is—they will be completely incorrect. No error or warning will typically be produced in this case, since the data is encrypted and the entity performing the computations therefore cannot decrypt it and realize that such an overflow has occurred. It should be noted that the range of values that can be correctly stored in a ciphertext depends on the FHE scheme and on how this scheme was configured, and can even change throughout the computation. For example, in the beginning of the computation, the range may be $[-100,100]$, then at later stages of the computation the range decreases to $[-1,1]$.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

One embodiment provides a computer-implemented method comprising: in response to identifying that a Single Instruction, Multiple Data (SIMD) operation has been instructed to be performed or has been performed by a Fully-Homomorphic Encryption (FHE) software on one or more original ciphertexts, performing the following steps, automatically: (a) performing the same operation on one or more original plaintexts, respectively, that are each a decrypted version of one of the one or more original ciphertexts; (b) decrypting a ciphertext resulting from the operation performed on the one or more original ciphertexts; (c) comparing the decrypted ciphertext with a plaintext resulting from the same operation performed on the one or more original plaintexts; and (d) based on said comparison, performing at least one of: (i) determining an amount of noise caused by the operation performed on the one or more original ciphertexts, (ii) determining whether unencrypted data underlying the one or more original ciphertexts has become corrupt by the operation performed on the one or more original ciphertexts, and (iii) determining correctness of an algorithm which includes the operation performed on the one or more original ciphertexts.

Another embodiment provides a system comprising at least one hardware processor and a non-transitory computer-readable storage medium having program code embodied therewith, the program code executable by said at least one hardware processor to: in response to identifying that a Single Instruction, Multiple Data (SIMD) operation has been instructed to be performed or has been performed by a Fully-Homomorphic Encryption (FHE) software on one or more original ciphertexts, perform the following steps, automatically: (a) performing the same operation on one or more original plaintexts, respectively, that are each a decrypted version of one of the one or more original ciphertexts; (b) decrypting a ciphertext resulting from the operation performed on the one or more original ciphertexts; (c) comparing the decrypted ciphertext with a plaintext resulting from the same operation performed on the one or more original plaintexts; and (d) based on said comparison, performing at least one of: (i) determining an amount of noise caused by the operation performed on the one or more original ciphertexts, (ii) determining whether unencrypted data underlying the one or more original ciphertexts has become corrupt by the operation performed on the one or more original ciphertexts, and (iii) determining correctness of an algorithm which includes the operation performed on the one or more original ciphertexts.

A further embodiment provides a computer program product comprising a non-transitory computer-readable storage medium having program code embodied therewith, the program code executable by at least one hardware processor to: in response to identifying that a Single Instruction, Multiple Data (SIMD) operation has been instructed to be performed or has been performed by a Fully-Homomorphic Encryption (FHE) software on one or more original ciphertexts, perform the following steps, automatically: (a) performing the same operation on one or more original plaintexts, respectively, that are each a decrypted version of one of the one or more original ciphertexts; (b) decrypting a ciphertext resulting from the operation performed on the one or more original ciphertexts; (c) comparing the decrypted ciphertext with a plaintext resulting from the same operation performed on the one or more original plaintexts; and (d) based on said comparison, performing at least one of: (i) determining an amount of noise caused by the operation performed on the one or more original ciphertexts, (ii) determining whether unencrypted data underlying the one or more original ciphertexts has become corrupt by the operation performed on the one or more original ciphertexts, and (iii) determining correctness of an algorithm which includes the operation performed on the one or more original ciphertexts.

In some embodiments, steps (a) and (b) are performed by the FHE software or by a different FHE software.

In some embodiments, the method is iterated over multiple SIMD operations, or the program code is executable to be iterated over multiple SIMD operations; and in each of the iterations: the one or more original ciphertexts are a result of performing the SIMD operation on the one or more original ciphertexts of the previous iteration, and the one or more original plaintext are a result of performing the same operation on the one or more original plaintexts of the previous iteration.

In some embodiments, the method further comprises, or the program code is further executable to: maintain a log of the comparisons of step (c) of all the iterations.

In some embodiments, the method or the program code is implemented as an implementation of an abstract Application Programming Interface (API) having a set of operators identical to a set of operators of the FHE software, or the In some embodiments, the abstract API comprises an abstract class programmed to interface with the FHE software so as to: provide instructions to the FHE software to perform the decryption of step (b); and receive the decrypted ciphertext from the FHE software.

In some embodiments, the abstract class is further programmed to: identify that the SIMD operation has been instructed to be performed by the FHE software on the one or more original ciphertexts; transparently pass to the FHE software any instructions from a user's algorithm that are intended for the FHE software, except for step (b) which is performed not by the FHE software; and perform the comparison of step (c).

In some embodiments of the method, it is performed by at least one hardware processor.

In addition to the exemplary aspects and embodiments described above, further aspects and embodiments will become apparent by reference to the 3s and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Disclosed herein is a technique, embodied in a method, a system, and a computer program product, for analyzing and/or debugging computational operations performed on data within the framework of FHE. The analysis and debugging may include, for example, determination of the amount of noise caused by an operation performed on one or more ciphertexts, determination of whether unencrypted data underlying the ciphertext(s) has become corrupt by the operation performed on the ciphertext(s), and determination of correctness of an algorithm which includes the operation performed on the ciphertext(s).

The technique may be particularly useful in the development stage of FHE applications, when a computation algorithm (a sequence of operations to be performed on encrypted data) is being devised. For example, when developing a FHE application that performs neural network inference on encrypted data, the developer may greatly benefit from being able to analyze and/or debug her algorithm before it is deployed.

The technique may generally operate as follows: In response to identifying that a SIMD operation has been instructed to be performed or has been performed by certain FHE software on one or more original ciphertexts, the following steps may be automatically and sequentially executed: First, the same operation is performed on one or more original plaintexts, respectively, that are each a decrypted version of one of the one or more original ciphertexts. Second, a ciphertext resulting from the operation that was performed on the one or more original ciphertexts is decrypted. Third, the decrypted ciphertext is compared with the plaintext resulting from the same operation. Fourth, based on the comparison, at least one of the following actions are performed: determining an amount of noise caused by the operation performed on the one or more original ciphertexts; determining whether unencrypted data underlying the one or more original ciphertexts has become corrupt by the operation performed on the original ciphertext; and determining correctness ("debugging") of an algorithm which includes the operation performed on the one or more original ciphertexts.

The technique is optionally implemented as an abstract Application Programming Interface (API) over one or more standard FHE software libraries, such as the open-source HElib library (S. Halevi and V. Shoup, "HElib—An Implementation of Homomorphic Encryption," available at https://github.com/shaih/HElib/, last viewed Dec. 19, 2021), the open-source SEAL library (Microsoft Research, "Microsoft SEAL," available at https://github.com/Microsoft/SEAL, last viewed Dec. 19, 2021), the open-source PALISADE library (available at https://palisade-crypto.org, last reviewed Dec. 19, 2021), and/or the like. This abstract API offers the same functions as the FHE libraries listed above, but it can be implemented in such a way that causes all operations performed on one or more ciphertexts to be automatically performed also on one or more plaintexts, respectively, such that any noise and/or data corruption can be automatically tracked and subsequently reported to a developer who uses the standard FHE software library.

Figure 1:
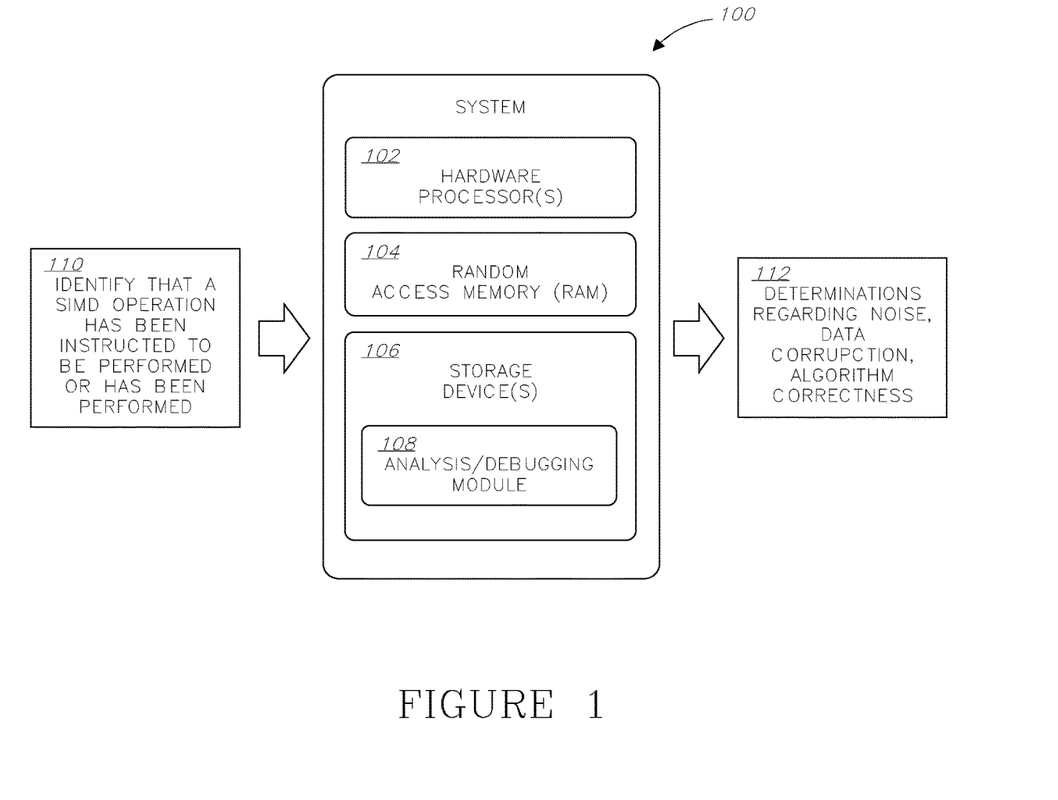
FIG. 1 is a block diagram of an exemplary system for analyzing and/or debugging FHE computational operations, according to an embodiment.

Reference is now made to FIG. 1, which shows a block diagram of an exemplary system 100 for analyzing and/or debugging FHE computational operations, according to an embodiment. System 100 may include one or more hardware processor(s) 102, a random-access memory (RAM) 104, and one or more non-transitory computer-readable storage device(s) 106.

Storage device(s) 106 may have stored thereon program instructions and/or components configured to operate hardware processor(s) 102. The program instructions may include one or more software modules, such as an analysis/debugging module 108. The software components may include an operating system having various software components and/or drivers for controlling and managing general system tasks (e.g., memory management, storage device control, power management, etc.), and facilitating communication between various hardware and software components.

System 100 may operate by loading instructions of analysis/debugging module 108 into RAM 104 as they are being executed by processor(s) 102. The instructions of analysis/debugging module 108 may cause system 100 to identify 110 that a SIMD operation has been instructed to be performed or has been performed by a FHE software on one or more original ciphertexts 110, execute a series of automatic actions in response, and output one or more determinations 112, such as an amount of noise caused by FHE operations; whether data corruption has occurred; and whether a computation algorithm (that drives the SIMD operation) is correct or not.

System 100 as described herein is only an exemplary embodiment of the present invention, and in practice may be implemented in hardware only, software only, or a combination of both hardware and software. System 100 may have more or fewer components and modules than shown, may combine two or more of the components, or may have a different configuration or arrangement of the components. System 100 may include any additional component enabling it to function as an operable computer system, such as a motherboard, data busses, power supply, a network interface card, a display, an input device (e.g., keyboard, pointing device, touch-sensitive display), etc. (not shown). Moreover, components of system 100 may be co-located or distributed, or the system may be configured to run as one or more cloud computing "instances," "containers," "virtual machines," or other types of encapsulated software applications, as known in the art.

Figure 2:
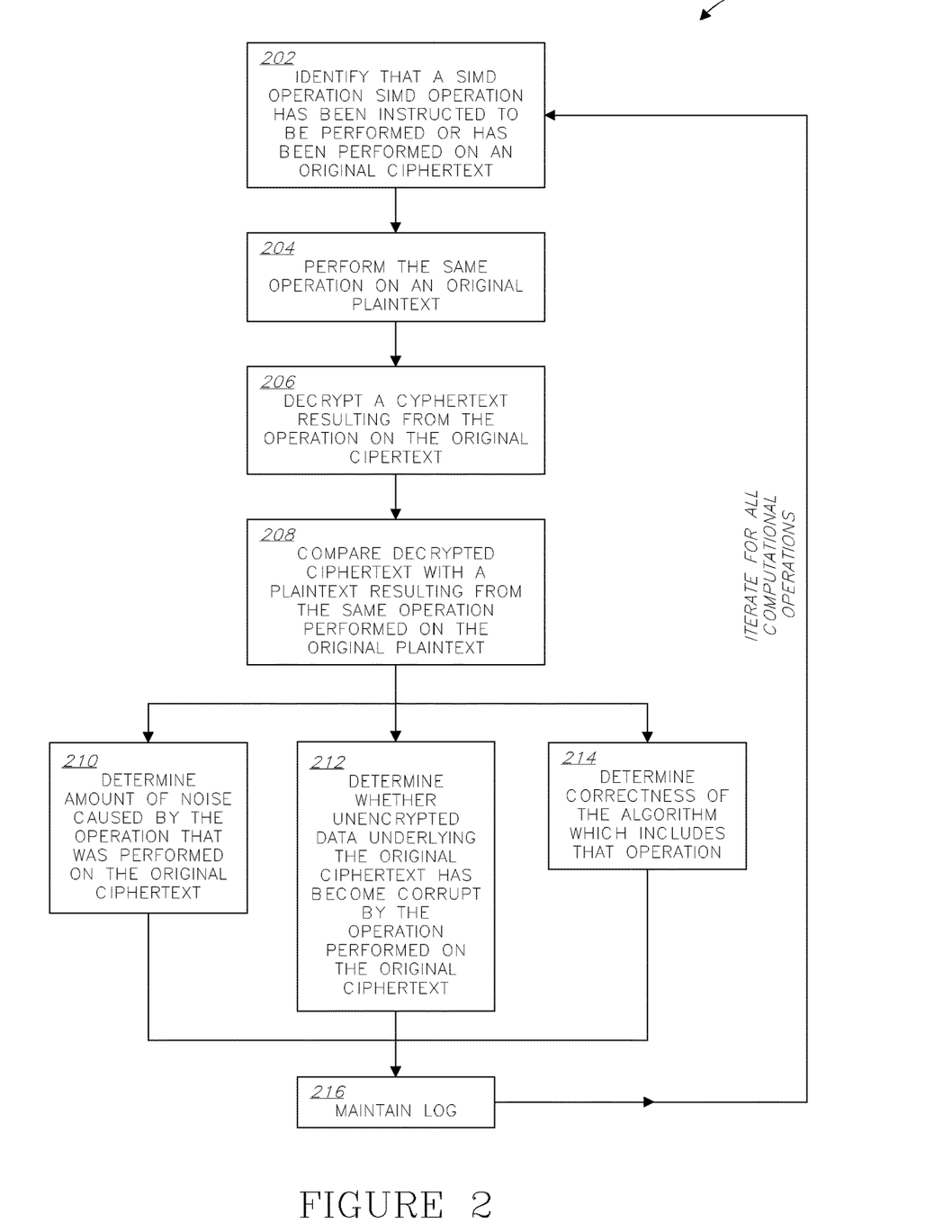
FIG. 2 is a flowchart of a method for analyzing and/or debugging FHE computational operations, according to an embodiment.

The instructions of analysis/debugging module 108 are now discussed with reference to the flowchart of FIG. 2, which illustrates a method 200 for analyzing and/or debugging FHE computational operations, in accordance with an embodiment.

Steps of method 200 may either be performed in the order they are presented or in a different order (or even in parallel), as long as the order allows for a necessary input to a certain step to be obtained from an output of an earlier step. In addition, the steps of method 200 are performed automatically (e.g., by system 100 of FIG. 1), unless specifically stated otherwise.

Method 200 is optionally implemented using an implementation of an abstract API over one or more standard FHE software libraries, as further discussed below in the Exemplary Implementations section.

In a step 202, it may be automatically identified that a SIMD operation has been instructed to be performed or has been performed by a FHE software on one or more certain ciphertexts (termed here "original ciphertext(s)"). The operation may be, for example, multiplication and/or addition, which are the basic operations available in the framework of FHE. It should be noted that the instructed operation may involve a single original ciphertext (such as multiplying that ciphertext by a certain value or adding a certain value to that ciphertext), or involve two (and potentially more) ciphertexts with the operation being performed therebetween (such as multiplication of one ciphertext by another, addition of two ciphertexts, etc.). Accordingly, this disclosure uses the terminology "one or more (original) ciphertexts" or simply "(original) ciphertext(s)" to denote these two possibilities. Consequently, the terminology "one or more (original) plaintexts" or more simply "(original) plaintext(s)" is used herein to denote that the operation instructed to be performed on the "one or more (original) ciphertexts" is also being performed on "one or more (original) plaintexts," respectively. In other words, each of the (original) ciphertexts is associated with one (original) plaintext, in a one-to-one relationship.

In response to this identifying with respect to the SIMD operation, the following steps, numbered 204 through 214, may be automatically performed:

In a step 204, the same operation that has been instructed to be performed or has been performed on the one or more original ciphertexts, may also be performed on one or more plaintexts (termed here "original plaintext(s)" or "one or more original plaintexts") that are each a decrypted version of the one of the original ciphertext(s), respectively. The original plaintext(s) may be available from a preliminary step (not indicated in the Figure) of obtaining or generating such plaintext(s) and encrypting it/them using the FHE software, to produce the original ciphertext(s). The operation on the original plaintext(s) may be performed using ordinary arithmetic operations (for example, multiplication, and/or addition) provided directly, for example by system 100 of FIG. 1 or by any other computing device. As an alternative, the operation on the original plaintext(s) may be performed using the same FHE scheme used when performing the operation on the original ciphertext(s), whether using the same FHE software or a different FHE software that is configured with the same, pertinent FHE scheme.

In a step 206, a ciphertext resulting from the operation performed on the original ciphertext(s) may be decrypted using the pertinent FHE scheme, whether by the same FHE software or a different FHE software, as discussed above.

In a step 208, the decrypted ciphertext may be compared with a plaintext resulting from the same operation performed on the original plaintext(s). Any difference between the two, identified in this step, may then serve as an indication that the operation performed on the original ciphertext(s) has introduced certain noise into the data underlying the original ciphertext(s), or has even completely corrupted the underlying data.

Accordingly, based on the comparison of step 208, one or more of the following actions may be performed:

A first possible action, described with reference to a step 210, is to determine an amount of noise caused by the operation that was performed on the original ciphertext(s). As a simplistic example, if the CKKS scheme was used to perform the operation, and the decrypted ciphertext includes a value of 1.00001 while the plaintext resulting from the same operation has a value of 1.00002, then it can be determined that noise amounting to 0.00099999% has been caused by the operation.

In a variant of the first action, step 210 may be also configured to alert the user immediately upon the determined noise exceeding a certain predefined threshold. The threshold may either refer to noise generated by a single operation, or accumulated over multiple operations. The alert may be in the form of 'throwing' an exception, as known in the field of computer programming.

A second possible action, described with reference to a step 212, is to determine whether unencrypted data underlying the original ciphertext(s) has become corrupt by the operation performed on the original ciphertext(s). Such data corruption may be caused, for example, by the result of the operation exceeding the maximal range of values allowed in the resulting ciphertext at this point in the computation. To determine whether that underlying data has been corrupted, and also to differentiate it from noise, the difference found in step 208 may be compared against a predetermined threshold. The threshold may be set to a value (either an absolute number or a percentage) high enough to ensure that data corruption is not mistaken for noise. For example, the threshold may be set at a 10% difference between the decrypted ciphertext and the plaintext resulting from the same operation performed on the original plaintext. Suitable thresholds may be in the range of, for example, 5-20%, and the exact threshold may be selected by the user based on the type of computations at hand.

In a variant of the second action, step 212 may also be configured to alert the user immediately upon determining that the unencrypted data underlying the original ciphertext(s) has become corrupt. The alert may be in the form of throwing an exception. Another possibility is to automatically change, or guide the user to change, (a) the configuration of the FHE software or scheme to allow a wider range of values, and/or (b) the way the computations are performed.

A third possible action, described with reference to a step 214, is to determine correctness of the algorithm which includes that operation. This action may also be referred to as a "debugging" of the algorithm. This may be performed automatically, such as by detecting what line(s) of the algorithm are the culprit of the difference arising out of step 208, or manually by the developer, who may be able to understand, based on that difference, which portion(s) of the algorithm may be incorrect.

It should be noted that method 200 may also operate without carrying out any of steps 210-214, but rather by only providing the results of the comparison of step 208 as its ultimate output. In certain scenarios, such automated comparison may be of value to a user of method 200 (such as the developer) in and of itself.

Method 200, as described above, pertains to how a single operation is identified and then acted upon. As most algorithms which are used to drive FHE computations include many such operations, it may be useful to iterate the steps of method 200 for all computational operations, and maintain a log 216 of the results of step 208 (the comparison) and optionally also of the determination(s) made in one or more of steps 210-214, alongside a description of each operation. In each iteration, at least one of the original ciphertext(s) is the ciphertext resulting from the performance of the SIMD operation in the previous iteration, and, similarly, at least one of the original plaintext is the plaintext resulting from the performance of the same operation in the previous iteration. In other words, each new iteration involves at least one (and possibly all) of the ciphertext(s) and plaintexts(s) operated on in the previous iteration—depending on what the user's algorithm dictates. This logging allows tracking the evolution of the original ciphertext throughout the sequence of operations laid out in the algorithm.

When method 200 has completed to iterate over all computational operations, the user may review the log and be able to understand how noise, data corruption, and/or mistakes in the algorithm have affected the original ciphertext(s) (sometimes with a compounding effect) with each subsequent operation.

Table 1 below exemplifies this by showing a very simplistic log, illustrative of how logging the iterations of method 200 may be beneficial to the user in determining and tracking the evolvement of noise. The ciphertext values listed in this table are of course presented in their unencrypted, human-readable form. In addition, for reasons of simplification, the example in this table relates to an operation performed on a single original ciphertext and a single original plaintext.

TABLE 1

Exemplary log of sequential computational operations

| | Starting value (ciphertext) | Operation | Resulting value (ciphertext) | Resulting value (plaintext) | Difference (absolute value) | Difference (in %) |
|---|---|---|---|---|---|---|
| 1 | 1 | ×4 | 4.001 | 4 | 0.001 | 0.025 |
| 2 | 4.001 | +1 | 5.001 | 5 | 0.001 | 0.02 |

Line 1 of the table shows the first iteration of method 200. The underlying value of the original ciphertext is 1, and the operation performed on it, as well as on its associated original plaintext, is multiplication by 4. This results in the correct arithmetic result of 4 for the plaintext, but a slightly noisy (and arithmetically incorrect) result of 4.001 for the ciphertext. The absolute value of the difference is 0.001, which reflects 0.025% of the correct arithmetic result. It should be noted that real noise in FHE schemes, unlike in this simplistic example, tends to begin at orders of magnitude smaller.

The last two columns, indicating the difference, may of course be expressed by other means, such as by the quotient of the resulting ciphertext and plaintext values, by including only one of these columns in the log, etc. The format(s) of the indicated difference may therefore be user-configurable.

Figure 3:
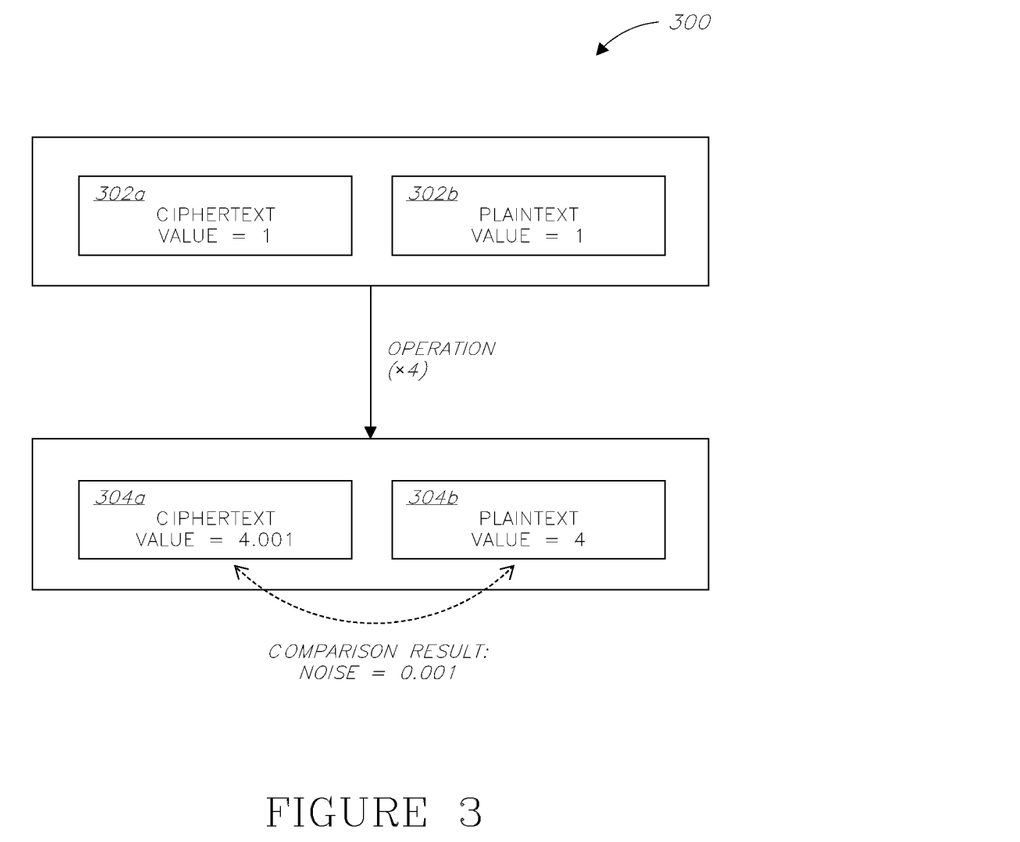
FIG. 3 is a flowchart illustrative of one iteration of the method of FIG. 2, according to an embodiment.

Interim reference is made to FIG. 3, which is a flowchart 300 illustrative of one iteration of method 200 represented by line 1 of the table. At the beginning of the iteration, the starting value of both the ciphertext 302a and its associated plaintext 302b is 1. Then an operation which includes multiplication by 4 is performed on these ciphertext 302a and plaintext 302b, resulting in a ciphertext 304a with the value 4.001 and a plaintext with the value 4. A comparison between the latter indicates a 0.001 noise value that has accumulated in this iteration of method 200.

Referring now back to Table 1, line 2 of the table shows the second iteration of method 200. The underlying value of the ciphertext is 4.001 (the ciphertext result of the previous iteration). The operation performed on this ciphertext now, as well as on its associated plaintext, is addition of 1. In this case, although there is a 0.02% difference between the two results, it is apparent that the noise did not increase from the previous iteration, but rather remained at 0.001. In other words, the addition operation did not produce any noise.

In other scenarios, logging 216 may also enable determining that a certain operation did not produce any noise, despite the appearance that the accumulated noise did increase following that operation. For example, if noise logged for 5 consecutive operations was as follows:

{0.00001, 0.00002, 0.00008, 0.0001, 0.001}, but the log indicates that the $3^{rd}$ operation was a multiplication by 4, then it is clear that no noise was produced in that operation. Rather, the noise expectedly grew fourfold because the noise from the $2^{nd}$ operation was accurately quadrupled by the very nature of the multiplication operation.

Exemplary Implementations

Implementation 1

As briefly mentioned above, method 200 may be optionally implemented using an abstract API (in an object-oriented programming language) over one or more standard FHE software libraries. To this end, an abstract class may be provided, which has the same interface as standard FHE software library. That is, it offers the same set of operators as those that exist in that standard FHE software library: encrypt, decrypt, multiply, add, and so on. A concrete implementation of this API can delegate the calls to a specific FHE library, and multiple such concrete implementations can be created for multiple different FHE libraries. Embodiments of the present invention can be implemented as yet another concrete implementation of this API, such that each operation is done on one or more ciphertexts by delegating the call to an FHE library, and also on one or more respective plaintexts, as specified by method 200.

The implementation of method 200 as the implementation of such an abstract API may enable a user to analyze and/or debug FHE computational operations by indirectly working with an underlying standard FHE software library through the abstract API. In other words, the user's algorithm may include instructions to act upon operators (e.g., functions, methods, classes etc.) identical to those of the library (to which the user is accustomed), and the abstract class will transparently, without the user even being aware, perform the steps of method 200 either by instructing the library (and receiving back its results) or by executing code of the abstract class itself.

With reference to method 200, the step of identifying that a SIMD operation is being performed (202) may be inherent to this implementation and may not in fact require specific execution. Rather, in response to the user's algorithm providing an instruction (intended for an underlying FHE software library, as apparent, for example, from their syntax) to perform such operation on the original ciphertext(s), the abstract class will inherently let the instruction pass on to the library (step 202), and also either utilize its own program code to perform the same operation on the original plaintext(s) (step 204), or send instructions to the library (or to a different library which uses the same FHE scheme) to accomplish step 204. For each of steps 202 and 204, the code of the abstract class is of course also configured to receive back from the pertinent library the results of its computation. Then, to perform step 206, the abstract class may send an instruction to the library (or, as before, to a different library which uses the same FHE scheme) to decrypt the ciphertext resulting from the operation performed on the original ciphertext(s), and receive back the decrypted ciphertext. Next, in step 208, the abstract class itself may include program code that performs the comparison between the decrypted ciphertext and the plaintext resulting from step 204, as well as code that performs one or more of steps 210-214.

Implementation 2

A second implementation may be similar to the first implementation, with the major difference being that instead of working on ciphertexts, it works only on plaintexts. Namely, the underlying standard FHE software library does not have to be utilized for any task whatsoever, but rather the actions may be performed on the plaintext only, without the aid of the FHE software (such as using the computer's standard arithmetic computation capabilities).

With reference to method 200, step 204 may still be performed in response to detecting that a SIMD operation has been instructed by the user's algorithm on one or more ciphertexts, but is performed on one or more respective plaintexts that have not undergone FHE encryption. As a matter of fact, in this implementation, the abstract class may refrain from encrypting the user's original data into a ciphertext at all (even if instructed to do so by the user's algorithm), such that all there is available when method 200 begins is actually one or more plaintexts. Hence, when the user instructs a SIMD operation on what she considers to be ciphertext(s), the operation will in fact be performed on plaintext(s)—the user's original unencrypted data. Consequently, steps 206 and onward can be omitted, except for performing a variant of step 214 in which the correctness of the algorithm may be determined.

This implementation may be particularly useful for debugging purposes, namely, to determine correctness of the user's algorithm (in accordance with step 214). However, it may not be suitable for determining noise and data corruption, as these are not expected to occur when performing the computational operations on plaintexts.

One particular advantage of this implementation is its speed. By omitting any encryption and decryption operations, and not performing any operations on ciphertexts, this implementation is likely to execute much faster for a given user algorithm than any implementation that does require such actions.

Implementation 3

A third implementation may also be similar to the first implementation, with the major difference being that it performs each operation on one or more tuples each containing two ciphertexts c1, c2 and two plaintexts p1, p2. Before each operation, in each such tuple, c1 is decrypted, and the result is copied into p1; in addition, p2 is encrypted and the result is copied into c2. This enables the user to distinguish between noise caused by any particular operation and noise that has accumulated over multiple previous operations.

Figure 4:
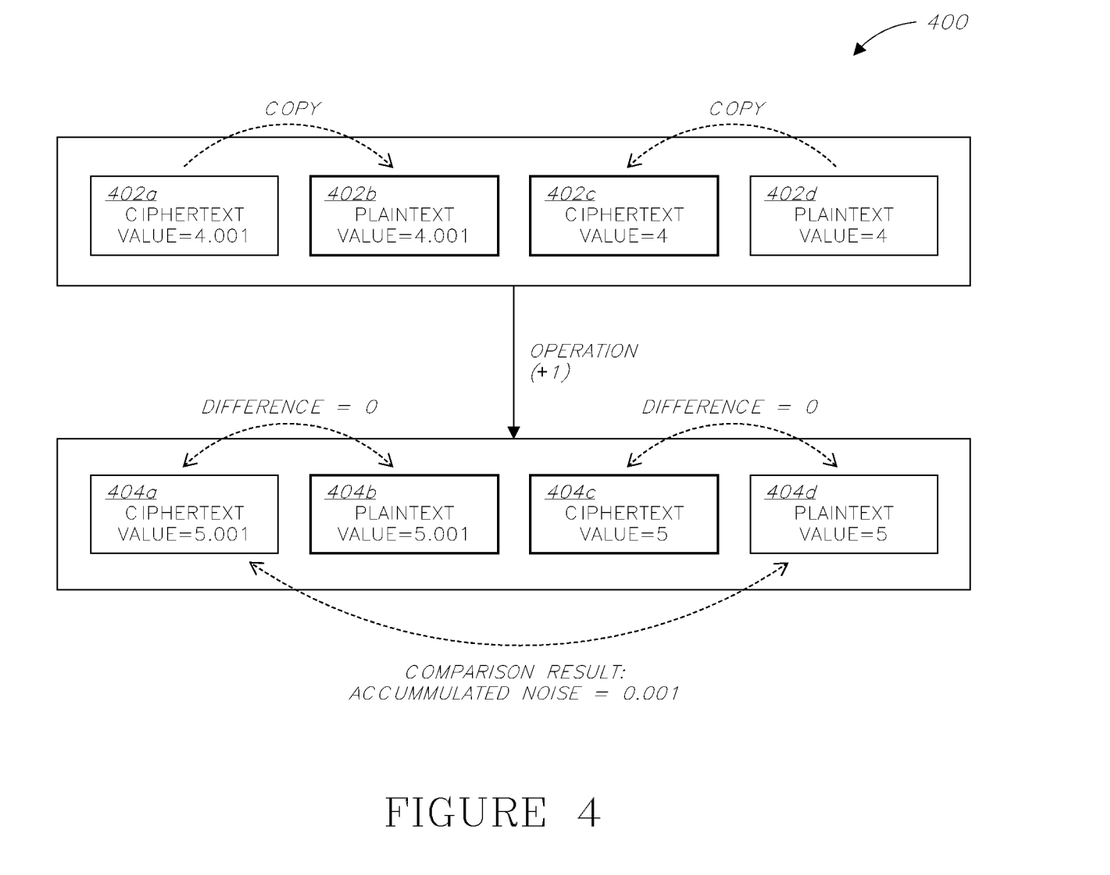
FIGS. 4, 5, and 6 are flowcharts illustrative of one iteration of a certain possible implementation, according to an embodiment.

Reference is now made to FIG. 4, which is a flowchart 400 illustrating one iteration according to this implementation. This may be, for example, the iteration described by line 2 of Table 1, and thus relates to a simple case in which only a single original ciphertext is operated upon, which in our case it is single tuple of c1, c2, p1, and p2.

In flowchart 400, blocks 402a and 402d are essentially the same as blocks 302a and 302b, respectively, of FIG. 3, expect for their different values. Similarly, blocks 404a and 404d are essentially the same as blocks 304a and 304b, respectively, of FIG. 3, expect for their different values. FIG. 4, therefore, adds blocks 402b and 402c with pre-operation values, and blocks 404b and 404c with post-operation values.

This implementation may work as follows. First, it can be noticed from block 402a that noise with a value of 0.001 has already been accumulated as a result of one or more previous iterations (for instance, the iteration of line 1 of Table 1). Before performing the computational operation of the illustrated operation, two actions may take place: One is copying the value underlying the ciphertext of block 402*a* (=4.001), which is the result of the previous operation performed on the ciphertext, into a plaintext (block 402*b*). Another is copying the value of the plaintext of block 402*d* (=4), which is the result of the previous operation performed on the plaintext, into a ciphertext (block 402*c*).

Then, the operation of the pertinent iteration (in this case, addition of 1) is being performed on all four blocks, 402*a* through 402*d*.

The result of this operation is a value of 5.001 underlying the ciphertexts of both block 404*a* and block 404*b*, and a value of 5 for the plaintexts of both blocks 404*c* and 404*d*.

Then, by comparing the differences between blocks 404*a* and 404*b*, blocks 404*c* and 404*d*, and lastly 404*a* and 404*d*, it is apparent that the accumulated noise following this operation is 0.001, but it is not the result of the current iteration but rather of one of the previous iterations—since the differences between blocks 404*a* and 404*b*, and between blocks 404*c* and 404*d*, were all zero. Given this determination as to the noise, the user may be guided by method 200 to make changes to her algorithm so that noise buildup prior to this iteration is reduced.

Figure 5:
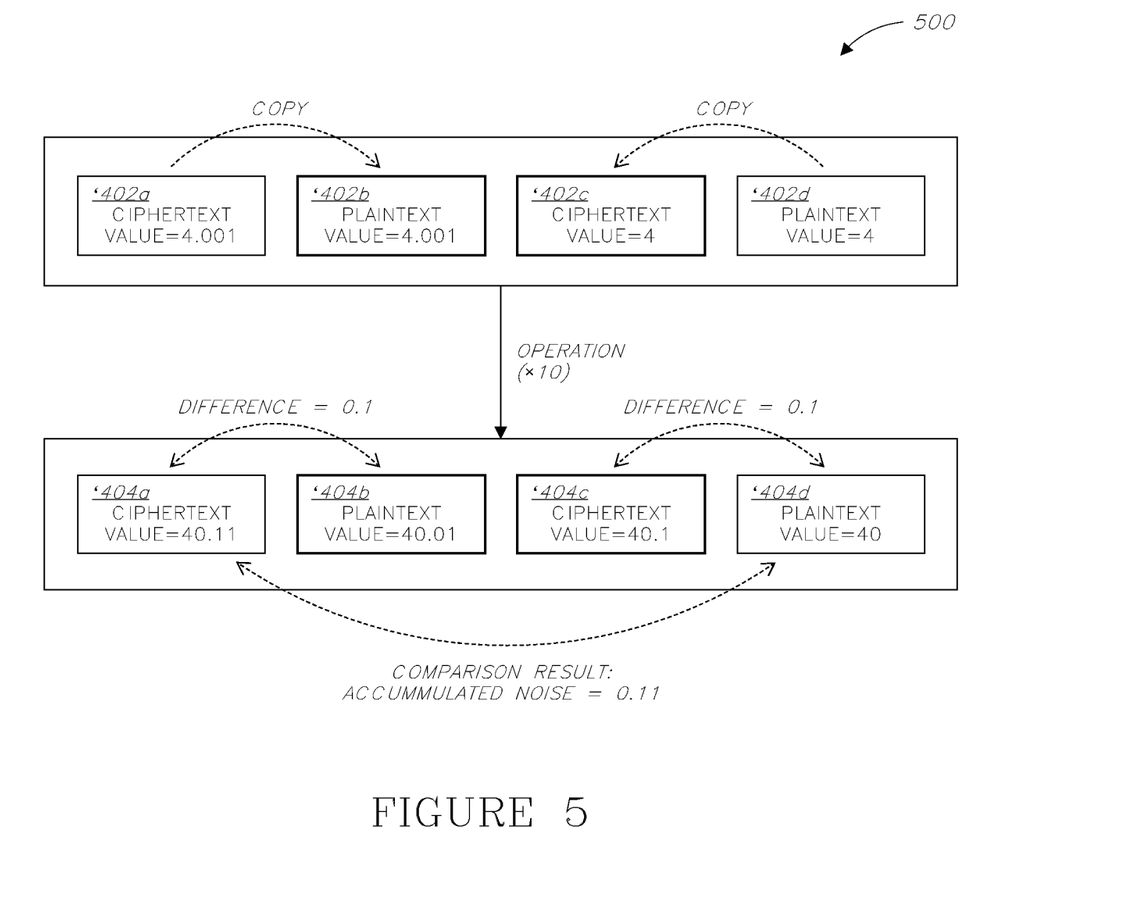

Reference is now made to FIG. 5, which is a flowchart 500 similar to the one in FIG. 4, but with a different numerical example that leads to different conclusions as to the source of the noise. Similar elements in FIGS. 4 and 5 are denoted by same reference numerals, except for a single quote added to the reference numerals in FIG. 5.

In flowchart 500, it can be seen that the initial noise is 0.001, as in FIG. 4; this is apparent from the difference between blocks '402*a* and '402*d*. Following the copying between blocks '402*a-d* as discussed above, a certain operation, such as multiplication by 10, is performed on all these four blocks. The result is a difference of 0.1 between blocks '404*a* and '404*b*, and similarly between blocks '404*c* and '404*d*, indicating that the current iteration is responsible for adding a noise of 0.1, compared with the noise of just 0.001 accumulated prior to this iteration. Given this determination as to the noise, the user may be guided by method 200 to make changes to her algorithm so that noise caused by the current operation is reduced, as it is far more significant (by two orders of magnitude) that the prior buildup of noise.

Figure 6:
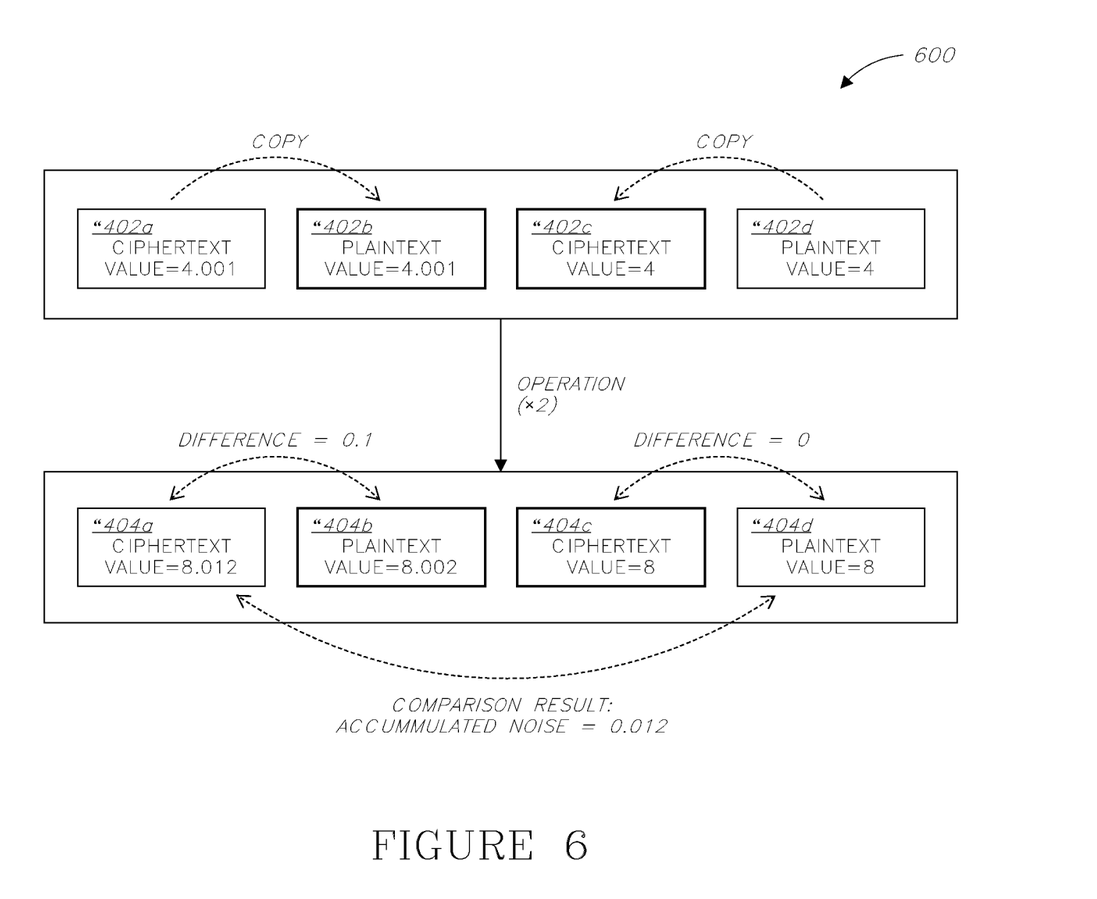

Reference is now made to FIG. 6, which is a flowchart 600 similar to the ones in FIGS. 4 and 5, but with yet another numerical example that leads to different conclusions as to the source of the noise. Similar elements in FIGS. 4, 5, and 6 are denoted by same reference numerals, except for a double quote added to the reference numerals in FIG. 6.

In flowchart 600, it can be seen that the initial noise is 0.001, as in FIGS. 4 and 5; this is apparent from the difference between blocks "402*a* and "402*d*. Following the copying between blocks "402*a-d* as discussed above, a certain operation, such as multiplication by 2, is performed on all these four blocks. The result is a difference of 0.1 between blocks "404*a* and "404*b*, but no difference between blocks "404*c* and "404*d*, indicating that the operation of the current iteration works accurately for already accurate (not noisy) input values (of block "402*d*), adds noise to inaccurate (noisy) input values (of block "402*a*"). A possible explanation for this phenomenon is that the particular operation executed in this iteration underperforms for certain ranges of real numbers. Given this determination as to the noise, the user may be guided by method 200 to either make changes to her algorithm so that an alternative and less problematic operation is used, e.g., one that works accurately for a larger range of numbers, or to treat just the symptom of this problem by reducing noise buildup prior to this iteration and thus limiting the significant noise jump by this particular operation.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, a field-programmable gate array (FPGA), or a programmable logic array (PLA) may execute the computer readable program instructions by utilizing state information of the computer readable program instructions to personalize the electronic circuitry, in order to perform aspects of the present invention. In some embodiments, electronic circuitry including, for example, an application-specific integrated circuit (ASIC), may be incorporate the computer readable program instructions already at time of fabrication, such that the ASIC is configured to execute these instructions without programming.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In the description and claims, each of the terms "substantially," "essentially," and forms thereof, when describing a numerical value, means up to a 20% deviation (namely, ±20%) from that value. Similarly, when such a term describes a numerical range, it means up to a 20% broader range-10% over that explicit range and 10% below it).

In the description, any given numerical range should be considered to have specifically disclosed all the possible subranges as well as individual numerical values within that range, such that each such subrange and individual numerical value constitutes an embodiment of the invention. This applies regardless of the breadth of the range. For example, description of a range of integers from 1 to 6 should be considered to have specifically disclosed subranges such as from 1 to 3, from 1 to 4, from 1 to 5, from 2 to 4, from 2 to 6, from 3 to 6, etc., as well as individual numbers within that range, for example, 1, 4, and 6. Similarly, description of a range of fractions, for example from 0.6 to 1.1, should be considered to have specifically disclosed subranges such as from 0.6 to 0.9, from 0.7 to 1.1, from 0.9 to 1, from 0.8 to 0.9, from 0.6 to 1.1, from 1 to 1.1 etc., as well as individual numbers within that range, for example 0.7, 1, and 1.1.

The descriptions of the various embodiments of the present invention have been presented for purposes of illustration, but are not intended to be exhaustive or limited to the explicit descriptions. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the description and claims of the application, each of the words "comprise," "include," and "have," as well as forms thereof, are not necessarily limited to members in a list with which the words may be associated.

Where there are inconsistencies between the description and any document incorporated by reference or otherwise relied upon, it is intended that the present description controls.

What is claimed is:

1. A computer-implemented method comprising:
in response to identifying that a Single Instruction, Multiple Data (SIMD) operation has been instructed to be performed or has been performed by a Fully-Homomorphic Encryption (FHE) software on one or more original ciphertexts, performing the following steps, automatically:
(a) performing the same operation on one or more original plaintexts, respectively, that are each a decrypted version of one of the one or more original ciphertexts;
(b) decrypting a ciphertext resulting from the operation performed on the one or more original ciphertexts;
(c) comparing the decrypted ciphertext with a plaintext resulting from the same operation performed on the one or more original plaintexts; and
(d) based on said comparison, performing at least one of:
determining an amount of noise caused by the operation performed on the one or more original ciphertexts,
determining whether unencrypted data underlying the one or more original ciphertexts has become corrupt by the operation performed on the one or more original ciphertexts, and determining correctness of an algorithm which includes the operation performed on the one or more original ciphertexts;

wherein the method is implemented as an implementation of an abstract Application Programming Interface (API) having a set of operators identical to a set of operators of the FHE software; and wherein the abstract API comprises an abstract class programmed to interface with the FHE software so as to: provide instructions to the FHE software to perform the decryption of step (b), and receive the decrypted ciphertext from the FHE software.

2. The computer-implemented method of claim 1, wherein:

steps (a) and (b) are performed by the FHE software or by a different FHE software.

3. The computer-implemented method of claim 1, wherein:

the method is iterated over multiple SIMD operations; and in each of the iterations:

the one or more original ciphertexts are a result of performing the SIMD operation on the one or more original ciphertexts of the previous iteration, and the one or more original plaintext are a result of performing the same operation on the one or more original plaintexts of the previous iteration.

4. The computer-implemented method of claim 3, further comprising:

maintaining a log of the comparisons of step (c) of all the iterations.

5. The computer-implemented method of claim 1, wherein the abstract class is further programmed to:

identify that the SIMD operation has been instructed to be performed by the FHE software on the one or more original ciphertexts;

transparently pass to the FHE software any instructions from a user's algorithm that are intended for the FHE software, except for step (b) which is performed not by the FHE software; and perform the comparison of step (c).

6. The computer-implemented method of claim 1, performed by at least one hardware processor.

7. A system comprising:

at least one hardware processor; and a non-transitory computer-readable storage medium having program code embodied therewith, the program code executable by said at least one hardware processor to:

in response to identifying that a Single Instruction, Multiple Data (SIMD) operation has been instructed to be performed or has been performed by a Fully-Homomorphic Encryption (FHE) software on one or more original ciphertexts, perform the following steps, automatically:

(a) performing the same operation on one or more original plaintexts, respectively, that are each a decrypted version of one of the one or more original ciphertext, (b) decrypting a ciphertext resulting from the operation performed on the one or more original ciphertexts, (c) comparing the decrypted ciphertext with a plaintext resulting from the same operation performed on the one or more original plaintexts, and (d) based on said comparison, performing at least one of:

determining an amount of noise caused by the operation performed on the one or more original ciphertexts, determining whether unencrypted data underlying the one or more original ciphertexts has become corrupt by the operation performed on the one or more original ciphertexts, and determining correctness of an algorithm which includes the operation performed on the one or more original ciphertexts;

wherein the program code is implemented as an implantation of an abstract Application Programming Interface (API) having a set of operators identical to a set of operators of the FHE software; and wherein the abstract API comprises an abstract class programmed to interface with the FHE software so as to: provide instructions to the FHE software to perform the decryption of step (b), and receive the decrypted ciphertext from the FHE software.

8. The system of claim 7, wherein:

steps (a) and (b) are performed by the FHE software or by a different FHE software.

9. The system of claim 7, wherein:

the program code is executable to be iterated over multiple SIMD operations; and in each of the iterations:

the one or more original ciphertexts are a result of performing the SIMD operation on the one or more original ciphertexts of the previous iteration, and the one or more original plaintext are a result of performing the same operation on the one or more original plaintexts of the previous iteration.

10. The system of claim 9, wherein the program code is further executable to:

maintain a log of the comparisons of step (c) of all the iterations.

11. The system of claim 7, wherein the abstract class is further programmed to:

identify that the SIMD operation has been instructed to be performed by the FHE software on the one or more original ciphertexts;

transparently pass to the FHE software any instructions from a user's algorithm that are intended for the FHE software, except for step (b) which is performed not by the FHE software; and perform the comparison of step (c).

12. A computer program product comprising a non-transitory computer-readable storage medium having program code embodied therewith, the program code executable by at least one hardware processor to:

in response to identifying that a Single Instruction, Multiple Data (SIMD) operation has been instructed to be performed or has been performed by a Fully-Homomorphic Encryption (FHE) software on one or more original ciphertexts, performing the following steps, automatically:

(a) performing the same operation on one or more original plaintexts, respectively, that are each a decrypted version of one of the one or more original ciphertexts;

(b) decrypting a ciphertext resulting from the operation performed on the one or more original ciphertexts;

(c) comparing the decrypted ciphertext with a plaintext resulting from the same operation performed on the one or more original plaintexts; and (d) based on said comparison, performing at least one of:

determining an amount of noise caused by the operation performed on the one or more original ciphertexts, determining whether unencrypted data underlying the one or more original ciphertexts has become corrupt by the operation performed on the one or more original ciphertexts, and determining correctness of an algorithm which includes the operation performed on the one or more original ciphertexts;

wherein the program code is implemented as an implementation of an abstract Application Programming Interface (API) having a set of operators identical to a set of operators of the FHE software; and wherein the abstract API comprises an abstract class programmed to interface with the FHE software so as to: provide instructions to the FHE software to perform the decryption of step (b), and receive the decrypted ciphertext from the FHE software.

13. The computer program product of claim 12, wherein:

the program code is executable to be iterated over multiple SIMD operations;

in each of the iterations:
the one or more original ciphertexts are a result of performing the SIMD operation on the one or more original ciphertexts of the previous iteration, and the one or more original plaintext are a result of performing the same operation on the one or more original plaintexts of the previous iteration.

14. The computer program product of claim 12, wherein the abstract class is further programmed to:

identify that the SIMD operation has been instructed to be performed by the FHE software on the one or more original ciphertexts;

transparently pass to the FHE software any instructions from a user's algorithm that are intended for the FHE software, except for step (b) which is performed not by the FHE software; and perform the comparison of step (c).

15. The computer program product of claim 12, wherein:

steps (a) and (b) are performed by the FHE software or by a different FHE software.

16. The computer program product of claim 12, wherein the program code is further executable to:

maintain a log of the comparisons of step (c) of all the iterations.

\* \* \* \* \*